(12) United States Patent
Tian et al.

(10) Patent No.: US 12,222,538 B2
(45) Date of Patent: Feb. 11, 2025

(54) DISPLAY DEVICES AND TILED DISPLAY DEVICES

(71) Applicants: Beijing BOE Display Technology Co., Ltd., Beijing (CN); BOE Technology Group Co., Ltd., Beijing (CN)

(72) Inventors: Zhaoshou Tian, Beijing (CN); Dan Li, Beijing (CN); Hongbo Feng, Beijing (CN); Haijun Shi, Beijing (CN); Bochang Wang, Beijing (CN); Bin Wu, Beijing (CN); Qingshan Qu, Beijing (CN); Shanlei Hou, Beijing (CN)

(73) Assignee: Beijing BOE Display Technology Co., Ltd., Beijing (CN)

( * ) Notice: Subject to any disclaimer, the term of this patent is extended or adjusted under 35 U.S.C. 154(b) by 0 days.

(21) Appl. No.: 18/282,218

(22) PCT Filed: Oct. 27, 2021

(86) PCT No.: PCT/CN2021/126702
§ 371 (c)(1),
(2) Date: Sep. 14, 2023

(87) PCT Pub. No.: WO2022/205870
PCT Pub. Date: Oct. 6, 2022

(65) Prior Publication Data
US 2024/0159955 A1    May 16, 2024

(30) Foreign Application Priority Data
Mar. 30, 2021 (CN) .......................... 202110341226.8

(51) Int. Cl.
F21V 8/00 (2006.01)

(52) U.S. Cl.
CPC .......... *G02B 6/0088* (2013.01); *G02B 6/0051* (2013.01); *G02B 6/0068* (2013.01); *G02B 6/0078* (2013.01)

(58) Field of Classification Search
CPC .. G02B 6/0088; G02B 6/0051; G02B 6/0068; G02B 6/0078
(Continued)

(56) References Cited

U.S. PATENT DOCUMENTS

2002/0140348 A1  10/2002  Takeuchi et al.
2008/0252808 A1  10/2008  Chang
(Continued)

FOREIGN PATENT DOCUMENTS

CN   202736410 U   2/2013
CN   103310739 A   9/2013
(Continued)

OTHER PUBLICATIONS

PCT/CN2021/126702 international search report.
PCT/CN2021/126702 Written Opinion.

*Primary Examiner* — Laura K Tso
(74) *Attorney, Agent, or Firm* — IPro, PLLC

(57) ABSTRACT

A display device and a tiled display device are provided. The display device includes: a display panel; a backlight module located on an incident side of the display panel, and including a frame and a light guiding structure, where the frame includes a first supporting surface and a second supporting surface both facing the display panel, where the second supporting surface is located on a side of the first supporting surface away from the display panel, the first supporting surface is attached to a backlight surface of the display panel, and the second supporting surface is engaged with the
(Continued)

light guiding structure. The assembling of the display panel and the backlight module can be achieved in the present disclosure.

20 Claims, 9 Drawing Sheets

(58) Field of Classification Search
USPC .......................................................... 362/633
See application file for complete search history.

(56) References Cited

U.S. PATENT DOCUMENTS

| | | | |
|---|---|---|---|
| 2013/0241976 A1 | 9/2013 | Kang et al. | |
| 2016/0202561 A1 | 7/2016 | Kong et al. | |
| 2016/0356952 A1* | 12/2016 | Kawabata | ............... F21V 17/00 |
| 2017/0315408 A1 | 11/2017 | Lee et al. | |
| 2018/0149924 A1* | 5/2018 | Tomizuka | ......... G02F 1/133606 |
| 2020/0409219 A1* | 12/2020 | Teragawa | .......... G02F 1/133524 |
| 2021/0302788 A1* | 9/2021 | Wang | ................ G02F 1/133603 |

FOREIGN PATENT DOCUMENTS

| | | | | |
|---|---|---|---|---|
| CN | 103440830 A | | 12/2013 | |
| CN | 107179850 A | | 9/2017 | |
| CN | 207199233 U | | 4/2018 | |
| CN | 108230914 A | * | 6/2018 | ........... G09F 9/3026 |
| CN | 110161751 A | | 8/2019 | |
| CN | 209880030 U | | 12/2019 | |
| CN | 209912426 U | | 1/2020 | |
| CN | 209946590 U | | 1/2020 | |
| CN | 210129366 U | | 3/2020 | |
| CN | 111175868 A | | 5/2020 | |
| CN | 111258138 A | | 6/2020 | |
| CN | 210865431 U | | 6/2020 | |
| CN | 215067622 U | | 12/2021 | |
| KR | 20080008063 A | | 1/2008 | |

* cited by examiner

DISPLAY DEVICES AND TILED DISPLAY DEVICES

CROSS-REFERENCE TO RELATED APPLICATIONS

This application is a national stage of international PCT Application No. PCT/CN2021/126702 filed on Oct. 27, 2021, which claims priority to Chinese patent application No. 202110341226.8 filed on Mar. 30, 2021 the entire contents of which are incorporated herein by reference.

TECHNICAL FIELD

This disclosure relates to a display technology, and more particularly, to display devices and tiled display devices.

BACKGROUND

With the development of science and technology, tiled display devices are used more and more widely. The tiled display device is generally obtained by tiling a plurality of independent display devices, each of which includes a display panel and a backlight module.

It is difficult to assemble the display panel and the backlight module.

SUMMARY

It is an object of the present disclosure to provide a display device and a tiled display device, so that the assembling a display panel and a backlight module can be achieved.

According to an aspect of the present disclosure, a display device is provided, the display device including:
 a display panel;
 a backlight module located on an incident side of the display panel, and including a frame and a light guiding structure, wherein the frame includes a first supporting surface and a second supporting surface both facing the display panel, wherein the second supporting surface is located on a side of the first supporting surface away from the display panel, the first supporting surface is attached to a backlight surface of the display panel, and the second supporting surface is engaged with the light guiding structure.

In some embodiments, the frame further includes:
 a back plate; and
 a middle frame including a fixing portion and a supporting portion, wherein the first supporting surface and the second supporting surface are at one end of the supporting portion; wherein the other end of the supporting portion extends away from the display panel and contacts the back plate; wherein the fixing portion is located on an outside of the supporting portion, one end of the fixing portion is fixed to the back plate, the other end of the fixing portion is between the two ends of the supporting portion, and an angle is formed between the fixing portion and the supporting portion.

In some embodiments, the back plate includes:
 a bottom wall by which one end of the supporting portion is supported; and
 a side wall connected with the bottom wall and located between the fixing portion and the supporting portion.

In some embodiments, the fixing portion is fixed to the side wall.

In some embodiments, the fixing portion is fixed to an end of the side wall away from the bottom wall.

In some embodiments, the side wall includes a first wall and a second wall connected with each other, the second wall is located on a side of the first wall away from the bottom wall, the first wall is recessed toward an inner side of the side wall with respect to the second wall; wherein the fixing portion is fixed to the second wall; and wherein the display device further includes:
 a chip-on-film covering a part of a side of the display panel;
 a protective plate connected with an outer side of the first wall, wherein a receiving space is formed between the protective plate and the first wall; and
 a circuit board located in the receiving space and electrically connected with the chip-on-film.

In some embodiments, the fixing portion is threadedly fixed to the side wall.

In some embodiments, the middle frame further includes:
 a reinforcing portion connected with an end of the supporting portion close to the bottom wall and supported by the bottom wall.

In some embodiments, the reinforcing portion is disposed at a side of the supporting portion away from the side wall.

In some embodiments, the one end of the supporting portion close to the display panel is bent toward an outer side of the supporting portion.

In some embodiments, the supporting portion includes a first supporting section and a second supporting section connected with each other along an extension direction of the supporting portion, the second supporting section is located at a side of the first supporting section close to the display panel, an extension direction of the first supporting section is perpendicular to the display panel, and the second supporting section is inclined toward an outer side of the supporting portion with respect to the first supporting section.

In some embodiments, the fixing portion is connected with the second supporting section.

In some embodiments, an inner surface of the supporting portion is a smoothly transitioning surface.

In some embodiments, the supporting portion and the fixing portion are an integral structure.

In some embodiments, the supporting portion and the fixing portion are made of aluminum or aluminum alloy.

In some embodiments, the first supporting surface is a strip-shaped surface parallel to a side of the display panel, and a width of the first supporting surface is 0.3 mm-2 mm.

In some embodiments, the display device further includes:
 a chip-on-film connected with the display panel and covering a part of a side of the display panel; and
 a guard member located on an outer side of the display panel and connected with the frame, wherein an orthographic projection of the guard member onto the side of the display panel does not overlap with an orthographic projection of the chip-on-film onto the side of the display panel.

In some embodiments, a number of chip-on-films are plural, and the chip-on-films are spaced apart along a direction parallel to the side of the display panel; and
 a number of guard members are plural, and the guard members are spaced apart along the direction parallel to the side of the display panel, and an orthogonal projection of any one of the guard members onto the side of the display panel does not overlap with an orthogonal projection of any one of the chip-on-films onto the side of the display panel.

In some embodiments, the display device further includes:
a circuit board located on an outside of the frame and electrically connected with the chip-on-film; and
a protective plate connected with an outer side of the frame, wherein a space for receiving the circuit board is formed between the protective plate and the frame; and the guard member is connected with a side of the protective plate.

In some embodiments, the guard member integrally extends from the protective plate.

In some embodiments, the guard member is inclined toward the display panel with respect to the protective plate, and an inclination angle of the guard member is 1°-2°.

In some embodiments, the protective plate includes a first plate and a second plate connected with each other, the second plate is located at a side of the first plate close to the display panel in a direction perpendicular to the display panel, the first plate is recessed toward an inner side of the frame with respect to the second plate, the first plate is connected with an outer side of the frame, a space for receiving the circuit board is formed between the second plate and the frame, and the guard member is connected with a side of the second plate away from the first plate.

In some embodiments, the frame includes:
a back plate including a side wall, the side wall being perpendicular to the display panel, wherein the protective plate is located on an outside of the side wall of the back plate, the first plate is fixed to the side wall of the back plate, the first plate is inclined toward an inner side of the protective plate with respect to the second plate, an inclination angle of the first plate is 1.5°-2.5°.

In some embodiments, in a direction parallel to the display panel, the display panel includes a first side and a second side opposite to each other; wherein the display panel includes a display region and a non-display region surrounding the display region; wherein the non-display region includes a first non-display region on a first side of the display panel and a second non-display region on a second side of the display panel; and a sum of a width of the first non-display region and a width of the second non-display region is equal to 2 mm.

In some embodiments, the first non-display region includes a binding region, the first non-display region and the second non-display region are provided with a frame adhesive, a width of the first non-display region is equal to 1.2 mm, and a width of the second non-display region is equal to 0.8 mm.

In some embodiments, the back plate includes:
a bottom wall by which one end of the supporting portion is supported;
a side wall connected with the bottom wall, the side wall being located between the fixing portion and the supporting portion;
the display device further includes:
a light-emitting structure disposed on a surface of the bottom wall facing the display panel, wherein the light-emitting structure includes a first light-emitting region, a second light-emitting region, and a third light-emitting region, the first light-emitting region is surrounded by the second light-emitting region, the second light-emitting region is surrounded by the third light-emitting region, the third light-emitting region is located at an edge region of the light-emitting structure, and a light-emitting intensity per unit area of the third light-emitting region is greater than a light-emitting intensity per unit area of the first light-emitting region.

In some embodiments, the light guiding structure includes a diffuser plate, and a material of the diffuser plate is polystyrene.

In some embodiments, a polarizer is provided on each of the incident side and an exit side of the display panel, the first supporting surface is coated with a fixing adhesive, and the first supporting surface is bonded to the polarizer on the incident side of the display panel by the fixing adhesive.

In some embodiments, the display panel includes a display region and a non-display region, the fixing adhesive is a UV adhesive, and an inner edge of the UV adhesive is spaced apart from the display region of the display panel by a distance of 0.1 mm-0.8 mm; and the UV adhesive is spaced apart from an outer edge of the display panel by a distance of 0.1 mm-0.8 mm.

In some embodiments, the light guiding structure includes: a diffuser plate disposed opposite to the display panel; a light guiding bar bonded between the diffuser plate and the second supporting surface and fixing edges of the diffuser plate on the second supporting surface, a transmittance of the light guiding bar is 60%-99%.

In some embodiments, the light guiding bar is attached to a side wall of the second supporting surface, and a distance between the light guiding bar and the side wall of the second supporting surface is smaller than a distance between the edges of the diffuser plate and the side wall of the second supporting surface.

In some embodiments, the light guiding structure and the second supporting surface are bonded by a fixing adhesive or a hot melt adhesive, and a light transmittance of the fixing adhesive or the hot melt adhesive is 60%-99%.

In some embodiments, the display device further includes: a light-emitting structure on a side of the bottom wall facing the display panel; and a reflector between the bottom wall and the light-emitting structure, wherein the reinforcement portion is pressed against an edge region of the reflector.

In some embodiments, a width of the first supporting surface is 0.88 mm or 1.76 mm.

In some embodiments, the display device further includes: a chip-on-film connected with the display panel and covering a part of a side of the display panel, wherein a side of the chip-on-film opposite to the side of the display panel is provided with an insulating organic film; and a guard member disposed on an outer side of the display panel and connected with the frame, wherein the guard member is pressed against the insulating organic film.

According to an aspect of the present disclosure, a tiled display device is provided, the tiled display device includes a tiled plurality of the display devices of any one of the display devices described above.

According to the display device and the tile display device of the present disclosure, a backlight module includes a frame and a light guiding structure, and the backlight module is located on an incident side of the display panel, and the frame includes a first supporting surface and a second supporting surface both facing the display panel, and the second supporting surface is engaged with the light guiding structure, and the first supporting surface is adhered to a backlight surface of the display panel, thereby assembling the display panel and the backlight module are achieved.

Figure 1:
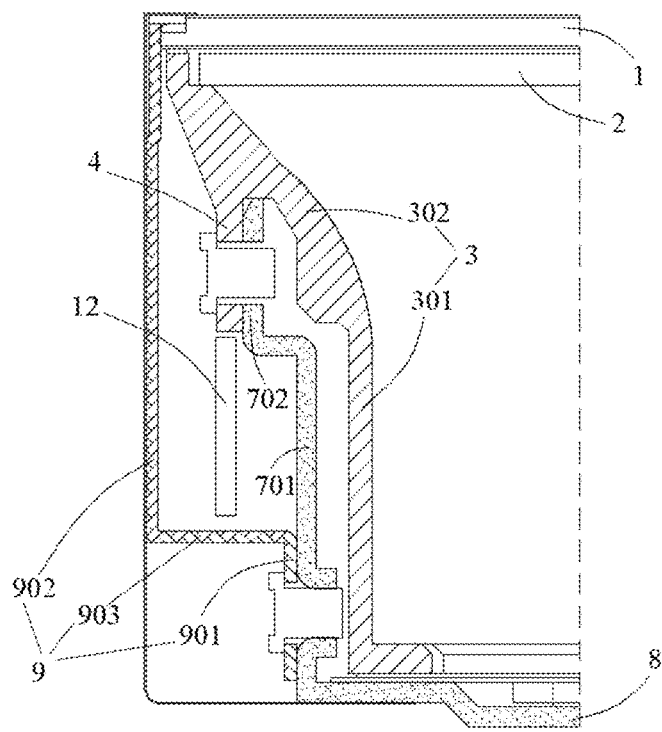
FIG. 1 is a schematic cross-sectional view of a display device according to an embodiment of the present disclosure.

| Reference numerals notes: | |
|---|---|
| 1, a display panel; | 101, a display region; |
| 102, a first non-display region; | 1021, a binding region; |
| 103, a second non-display region; | 2, a light guiding structure; |
| 201, a diffuser plate; | 202, a diffuser sheet; |
| 203, a light guiding bar; | 3, a supporting portion; |
| 301, a first supporting section; | 302, a second supporting section; |
| 4, a fixing portion; | 5, a first supporting surface; |
| 6, a second supporting surface; | 7, a side wall; |
| 701, a first wall; | 702, a second wall; |
| 703, a third wall; | 8, a bottom wall; |
| 9, a protective plate; | 901, a first plate; |
| 902, a second plate; | 903, a third plate; |
| 10, a frame adhesive; | 11, a reinforcing portion |
| 12, a circuit plate | 13, a chip-on-film |
| 14, a guard member | 15, a first protective adhesive |

| Reference numerals notes: | |
|---|---|
| 16, a second protective adhesive | 17, a light-emitting structure; |
| 1701, a first light-emitting region; | 1702, a second light-emitting region; |
| 1703, a third light-emitting region; | 18, a light source; |
| 100, a middle frame; | 200, a back plate. |

DETAILED DESCRIPTION OF THE EMBODIMENTS

Reference will be made herein in detail to exemplary embodiments, examples of which are illustrated in the accompanying drawings. When the following description refers to the accompanying drawings, the same numbers in different drawings represent the same or similar elements unless otherwise represented. The embodiments described in the following exemplary embodiments do not represent all embodiments consistent with the present disclosure. Instead, they are merely examples of devices consistent with some aspects of the present disclosure as detailed in the appended claims.

The terminology used herein is for the purpose of describing particular embodiments only and is not intended to be limiting of the present disclosure. Unless defined otherwise, technical or scientific terms used herein have the same meaning as is commonly understood by those skilled in the art to which the present disclosure belongs. The use of the terms first, second, and the like in the description and the claims herein does not indicate any order, quantity, or importance, but rather is used to distinguish one element from another. Also, the use of "a" or "an" or the like does not indicate a limitation of quantity, but rather denotes the presence of at least one of referenced item. "A plurality of" or "several" means two or more. Unless otherwise noted, the terms such as "front", "back", "lower" and/or "upper" are used merely for convenience of description and are not limited to a single position or spatial orientation. The terms such as "including" or "comprising" mean that elements or objects preceding "including" or "comprising" cover elements or objects following "including" or "including" and their equivalents, and do not exclude other elements or objects. The terms such as "connected" or "coupled" are not restricted to physical or mechanical connections, and may include electrical connections, whether direct or indirect. As used in the description and the appended claims of the disclosure, the singular forms "a", "an" and "the" are intended to include the plural forms as well, unless the context clearly indicates otherwise. It will also be understood that the term "and/or" as used herein refers to and encompasses any and all possible combinations of one or more of associated listed items.

Figure 2:
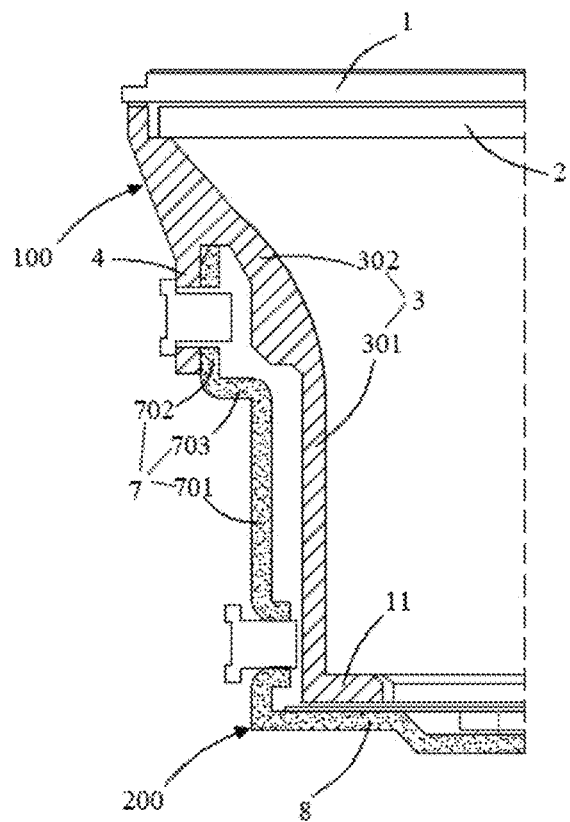
FIG. 2 is a schematic view of the display device shown in FIG. 1 after a protective plate has been removed.

Embodiments of the present disclosure provide a display device. As shown in FIGS. 1 and 2, the display device may include a display panel and a backlight module.

Figure 3:
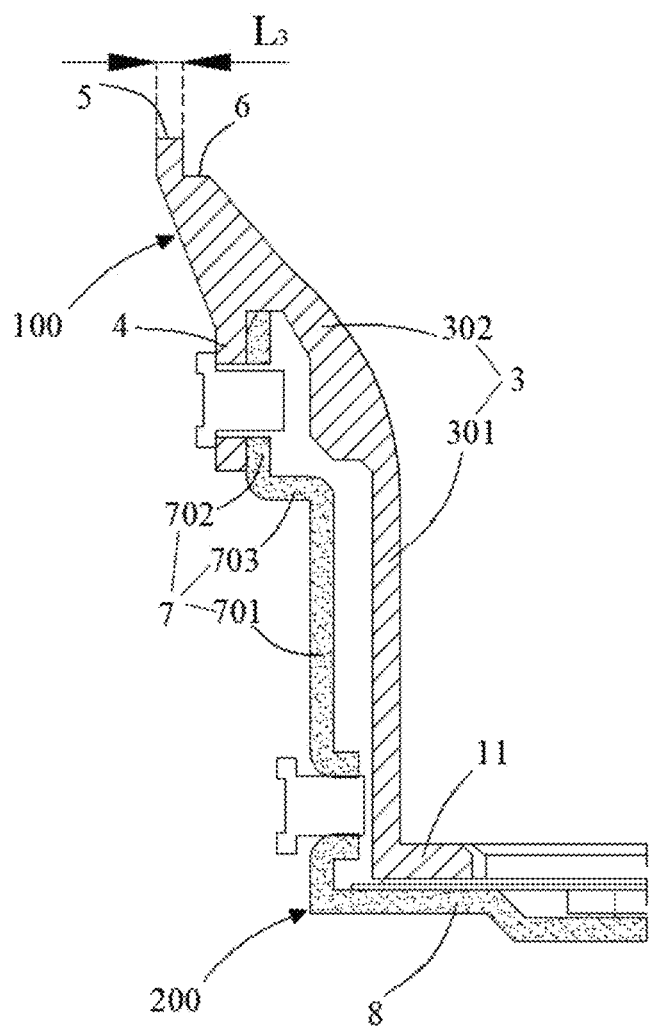
FIG. 3 is a schematic diagram showing a middle frame and a back plate of a display device according to an embodiment of the present disclosure.

The backlight module is located on a light incident side of the display panel and includes a frame and a light guiding structure 2. As shown in FIG. 3, the frame includes a first supporting surface 5 and a second supporting surface 6 both facing the display panel. The second supporting surface 6 is located on a side of the first supporting surface 5 away from the display panel. The first supporting surface 5 is adhered to a backlight surface of the display panel, and the second supporting surface 6 is engaged with the light guiding structure 2.

In the display device of the present disclosure, the backlight module includes a frame and a light guiding structure 2, and the backlight module is located on the light incident side of the display panel, and the frame includes the first supporting surface 5 and the second supporting surface 6 both facing the display panel, and the second supporting surface 6 is engaged with the light guiding structure 2, and the first supporting surface 5 is adhered to the backlight surface of the display panel, thereby achieving the assembling of the display panel and the backlight module.

Each part of the display device according to an embodiment of the present disclosure is described in detail below.

Figure 4:
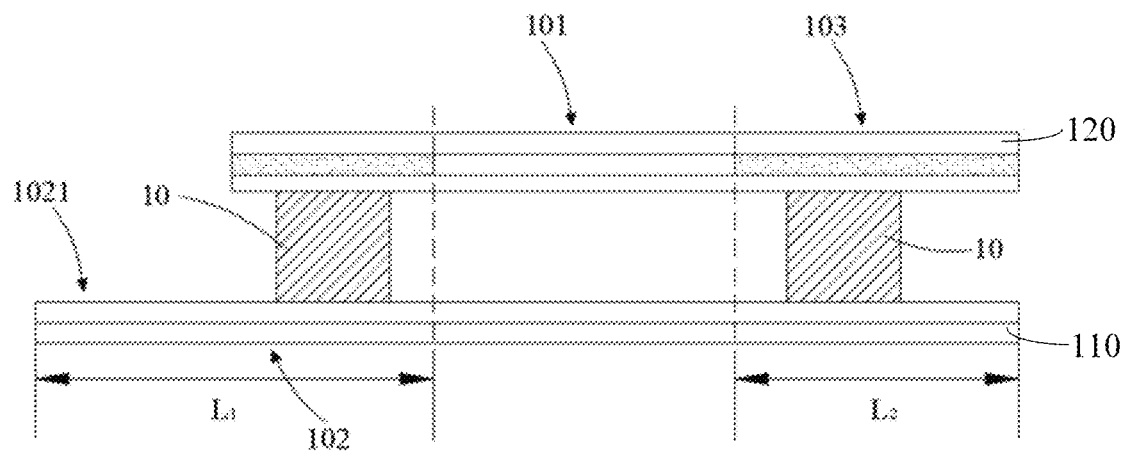
FIG. 4 is a schematic cross-sectional view of a display panel of a display device according to an embodiment of the present disclosure.

The display panel may be a liquid crystal display panel, which may include an array substrate and a color film substrate arranged opposite to each other, and a liquid crystal layer between the array substrate and the color film substrate. The display panel includes a first and a second side opposite to each other in a direction parallel to the display panel. As shown in FIG. 4, the display panel may include a display region 101 and a non-display region surrounding the display region 101. The non-display region includes a first non-display region 102 located on the first side of the display panel and a second non-display region 103 located on the second side of the display panel. The first non-display region 102 may include a binding region 1021. The first non-display region 102 and the second non-display region 103 may be provided with a frame adhesive 10. A sum of a width of the first non-display region 102 and a width of the second non-display region 103 may be equal to 2 mm. The width $L_1$ of the first non-display region 102 may be equal to 1.2 mm, and the width $L_2$ of the second non-display region 103 may be equal to 0.8 mm. In addition, the light incident side of the display panel is provided with a polarizer 110, and a light exit side of the display panel is provided with a polarizer 120.

Figure 5:
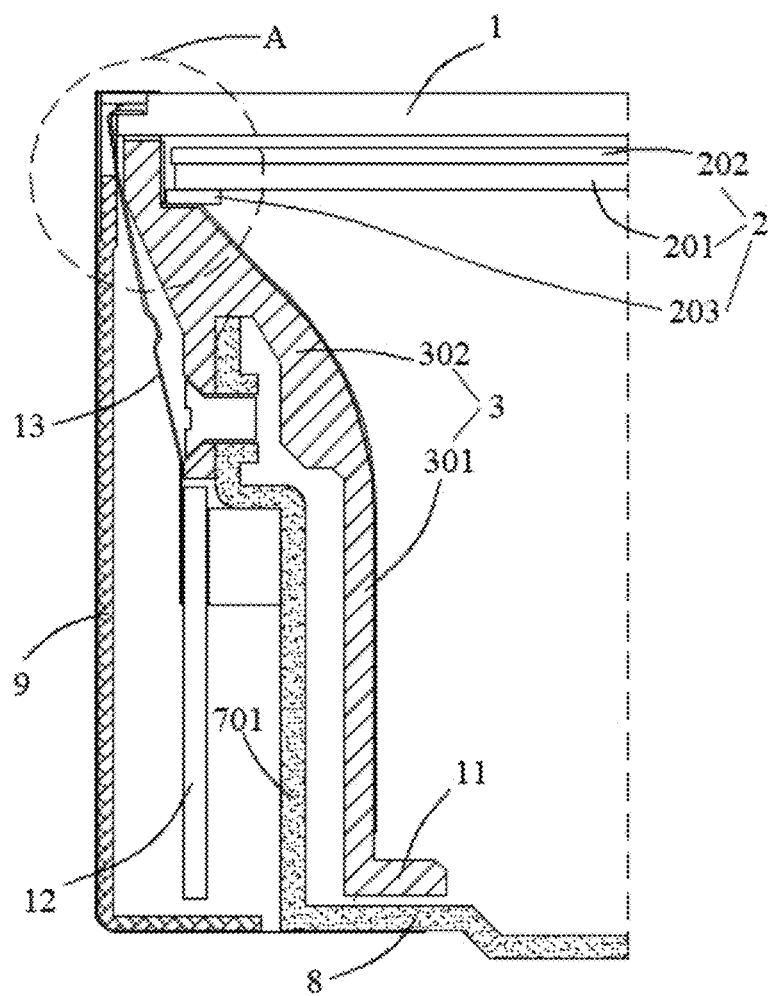
FIG. 5 is another schematic cross-sectional view of a display device according to an embodiment of the present disclosure.

As shown in FIG. 5, the light guiding structure 2 may include a diffuser plate 201. The diffuser plate 201 may be disposed opposite the display panel. The material of the diffuser plate 201 may be polystyrene (PS), but the present disclosure is not limited thereto. The light guiding structure 2 may include a diffuser sheet 202. The diffuser sheet 202 may be located on a side of the diffuser plate 201 facing the display panel.

The frame includes the first supporting surface 5 and the second supporting surface 6 both facing the display panel. The first supporting surface 5 may be parallel to the display panel. The first supporting surface 5 cooperates with the backlight surface of the display panel to connect the frame with the display panel. In an embodiment, the first supporting surface 5 is coated with a fixing adhesive, and the first supporting surface 5 is bonded to the polarizer located on the light incident side of the display panel by the fixing adhesive. The fixing adhesive on the first supporting surface 5 is bonded to an edge region of the polarizer. The first supporting surface 5 may be a strip-shaped surface and parallel to the sides of the display panel. As shown in FIG. 3, a width L3 of the first supporting surface 5 may be 0.3 mm-2 mm. Preferably, the width L3 of the first supporting surface 5 is 0.88 mm or 1.76 mm. The second supporting surface 6 may be parallel to the first supporting surface 5. The second supporting surface 6 is engaged with the light guiding structure 2, that is, the second supporting surface 6 supports the light guiding structure 2. Taking the light guiding structure 2 including the diffuser plate 201 and the diffuser sheet 202 as an example, the second supporting surface 6 is configured to support the diffuser plate 201. In an embodiment, the diffuser plate 201 may be bonded to the second supporting surface 6 by a fixing adhesive or hot melt adhesive. A light transmittance of the fixing adhesive or hot melt adhesive may be 60%-99%. The fixing adhesive above may be a UV (ultraviolet) adhesive. In another embodiment, as shown in FIG. 5, the light guiding structure 2 above may further include a light guiding bar 203 between the second supporting surface 6 and the diffuser plate 201. Both opposite surfaces of the light guiding bar 203 can be provided with an adhesive layer, the adhesive layer on one surface of the light guiding bar 203 is bonded to the second supporting surface 6, and the adhesive layer on the other surface of the light guiding bar 203 is bonded to the diffuser plate 201, so that the light guiding bar 203 is bonded between the diffuser plate 201 and the second supporting surface 6, and edges of the diffuser plate 201 are fixed on the second supporting surface 6. A light transmittance of the light guiding bar may be 60%-99%, but the present disclosure is not limited thereto. The second supporting surface 6 is located on a side of the first supporting surface 5 away from the display panel, that is, the first supporting surface 5 is located between the second supporting surface 6 and the display panel, that is, a distance between the first supporting surface 5 and the display panel is smaller than a distance between the second supporting surface 6 and the display panel. The distance between the first supporting surface 5 and the second supporting surface 6 in a direction perpendicular to the display panel needs to be greater than or equal to a thickness of the light guiding structure 2. The frame may further include a supporting side connecting the first supporting surface 5 and the second supporting surface 6. Taking the first supporting surface 5 and the second supporting surface 6 parallel to each other as an example, the supporting side may be perpendicular to the second supporting surface 6 so as to form a step structure on the frame, a step surface of the step structure being the second supporting surface 6 and the supporting side. The light guiding bar 203 may be bonded to the supporting side by an adhesive layer, and a distance between the light guiding bar 203 and the supporting side is smaller than a distance between the edge of the diffuser plate 201 and the supporting side.

As shown in FIG. 3, the frame may include a back plate 200 and a middle frame 100. The back plate 200 may include a bottom wall 8 and a side wall 7. The bottom wall 8 may be disposed opposite to the display panel mentioned above and located at a side of the light guiding structure 2 away from the display panel. The side wall 7 is connected with a side of the bottom wall 8 facing the display panel. The side wall 7 may include a first wall 701 and a second wall 702 that are interconnected. The second wall 702 is on a side of the first wall 701 away from the bottom wall 8, and the first wall 701 is recessed relative to the second wall 702 toward an inner side of the side wall 7, i.e., the second wall 702 is located on an outer side of the first wall 701. The side wall 7 may further include a third wall 703 connecting the first wall 701 and the second wall 702. The first wall 701 and the second wall 702 may each be perpendicular to the bottom wall 8. The third wall 703 may be parallel to the bottom wall 8, but the present disclosure is not so limited.

Figure 14:
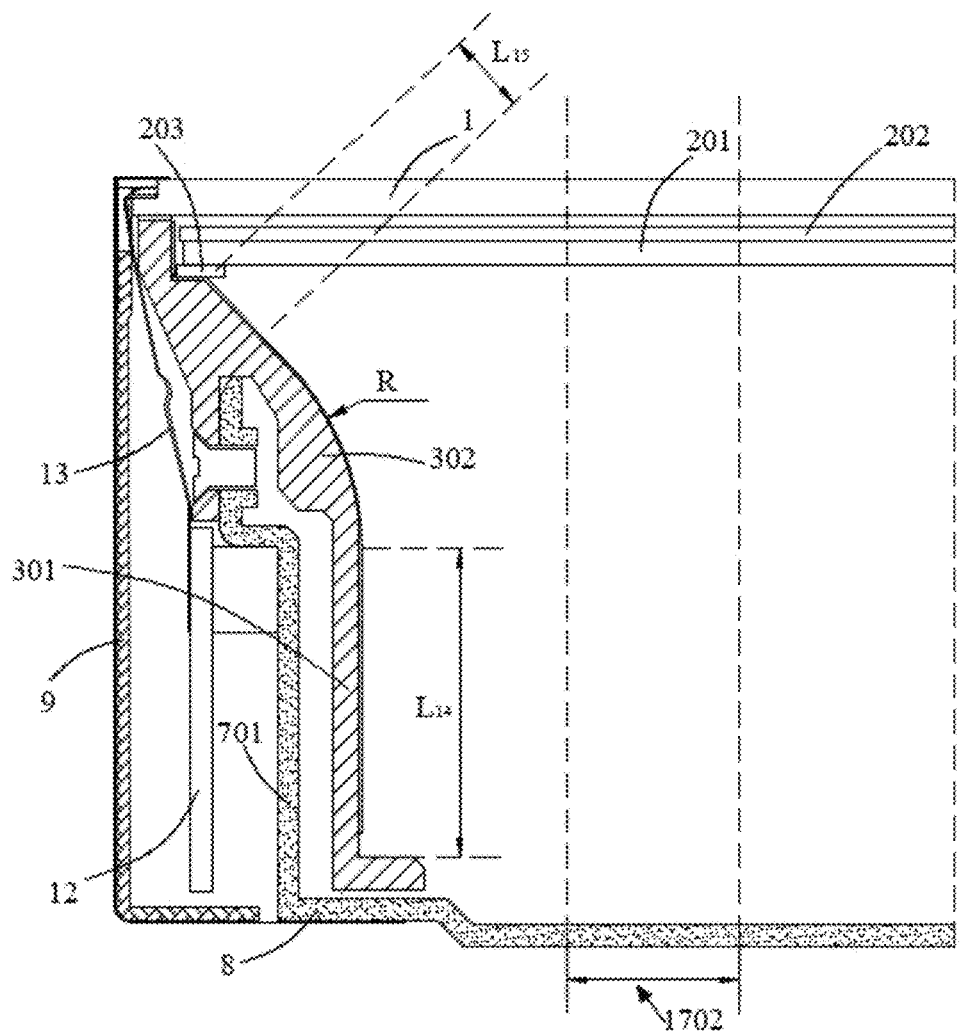
FIG. 14 is a schematic cross-sectional view of a display device according to an embodiment of the present disclosure.
Figure 15:
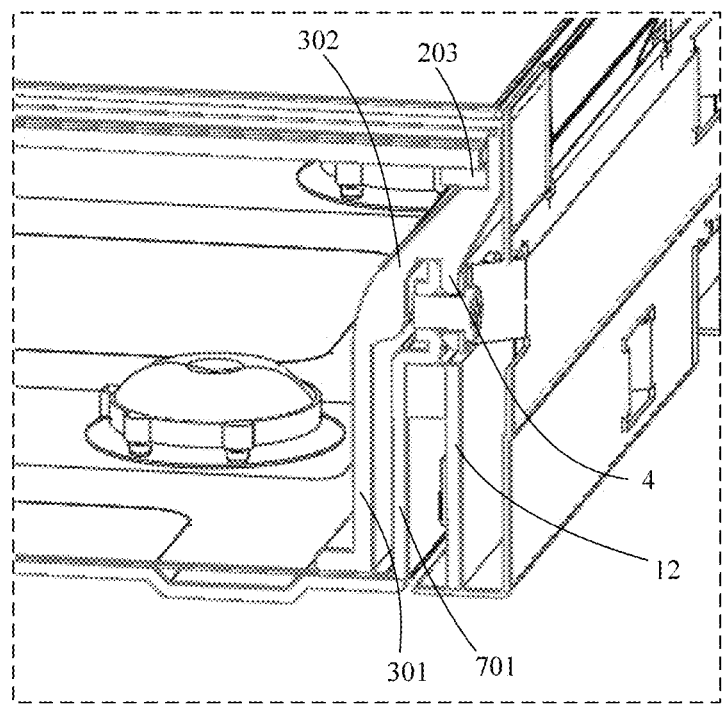
FIG. 15 is a partial cross-sectional view of a display device according to an embodiment of the present disclosure.
Figure 16:
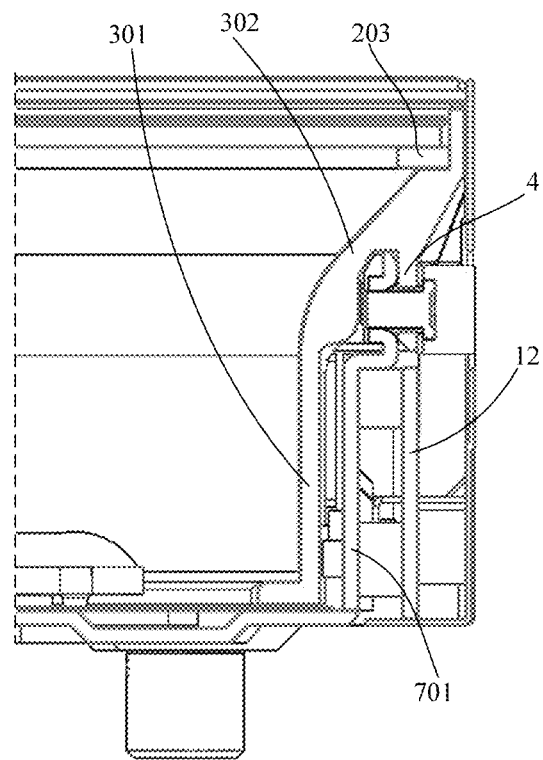
FIG. 16 is a plan view of the display device shown in FIG. 15.
Figure 17:
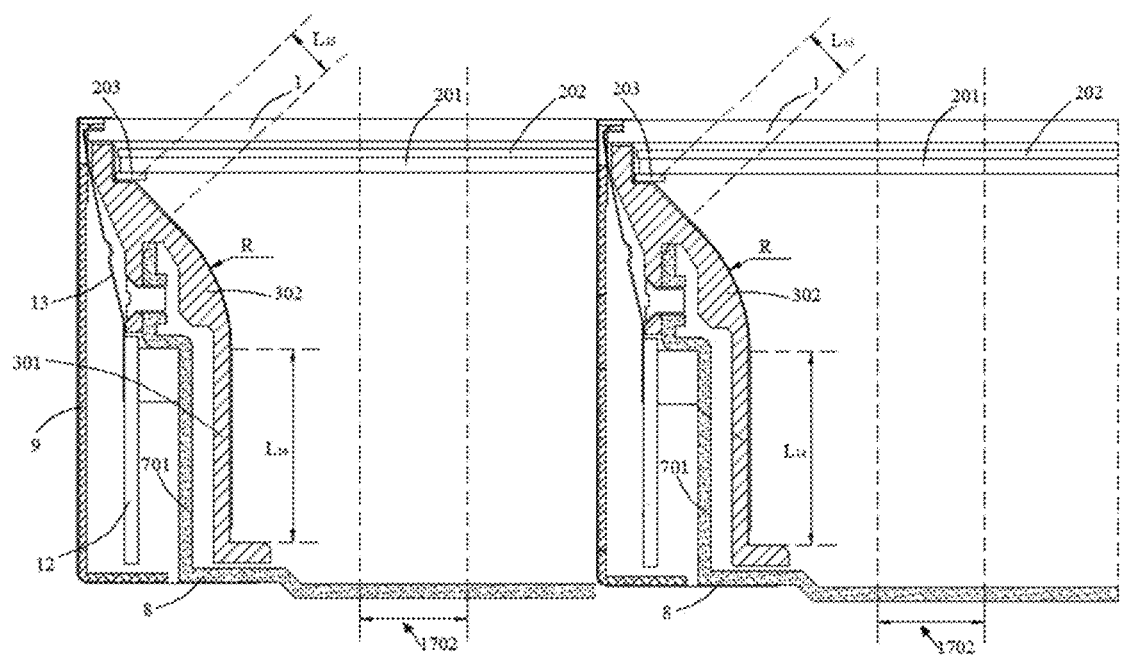
FIG. 17 is a schematic diagram illustrating a tiled display device according to an embodiment of the present disclosure.

The middle frame 100 may be fixed to the back plate 200. As shown in FIGS. 3, 15, and 16, the middle frame 100 may include a supporting portion 3 and a fixing portion 4. Each of the first supporting surface 5 and the second supporting surface 6 mentioned above is at one end of the supporting portion 3, i.e., an end surface of the supporting portion 3 facing the display panel includes the first supporting surface 5 and the second supporting surface 6, and the other end of the supporting portion 3 extends away from the display panel and contacts the back plate 200. The end of the supporting portion 3 away from the display panel contacts the bottom wall 8 of the back panel 200, such that the supporting portion 3 is supported on the bottom wall 8 of the back panel 200. The material of the supporting portion 3 may be aluminum or aluminum alloy, but the present disclosure is not limited thereto. The end of the supporting portion 3 close to the display panel is bent toward an outer side of the supporting portion 3. For example, as shown in FIG. 3, the supporting portion 3 includes a first supporting section 301 and a second supporting section 302 connected with each other along an extension direction of the supporting portion 3, the second supporting section 302 being located at a side of the first supporting section 301 close to the display panel, the extension direction of the first supporting section 301 being perpendicular to the display panel, and the second supporting section 302 being inclined toward an outer side of the supporting portion 3 with respect to the first supporting section 301. An inner surface of the supporting portion 3 may be a smooth transition surface to enhance the reflective effect of the inner surface of the supporting portion 3. As shown in FIG. 14, an inner surface of the first supporting section 301 is a flat surface, a length L14 of the flat surface of the first supporting section 301 in a direction perpendicular to the display panel may be 15.3 mm; an inner surface of the second supporting section 302 includes a flat surface and an arc surface connected with each other, a length L15 of the flat surface of the second supporting section 302 in an extending direction of the second supporting section 302 may be 8 mm; and a radius of curvature R of the arc surface of the second supporting section 302 may be 10 mm.

Figure 6:
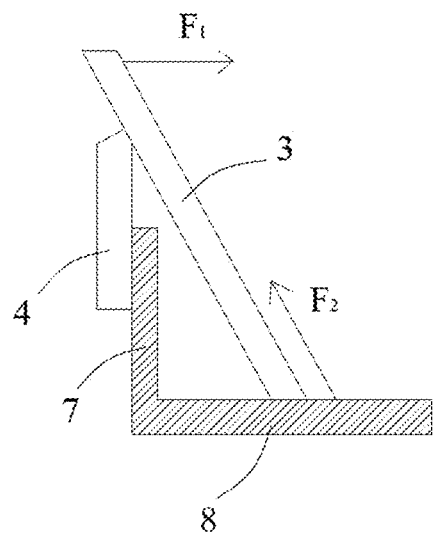
FIG. 6 is a force-receiving model diagram of a middle frame of a display device according to an embodiment of the present disclosure.

The fixing portion 4 may be located on an outside of the supporting portion 3. The side wall 7 of the back plate 200 mentioned above may be located between the supporting portion 3 and the fixing portion 4. One end of the fixing portion 4 may be connected with the supporting portion 3 between two ends of the supporting portion 3, and the other end of the fixing portion 3 may be fixed to the back plate 200, such that an angle is formed between the fixing portion 4 and the supporting portion 3. One end of the fixing portion 4 may be connected with the second supporting section 302 of the supporting portion 3, and the other end of the fixing portion 4 may be fixed to the side wall 7 of the back plate 200. The fixing portion 4 may be fixed to an end of the side wall 7 of the back plate 200 away from the bottom wall 8, that is, the fixing portion 4 may be fixed to an upper region on the side wall 7 of the back plate 200. In an embodiment, the fixing portion 4 may be fixed to the second wall 702 of the side wall 7 of the backing plate 200. The fixing portion 4 may be detachably connected with the side wall 7 of the back plate 200, such as by a threaded connection, but embodiments of the present disclosure are not limited thereto. In addition, the fixing portion 4 may have a plate-like structure and be parallel to the second wall 702 of the side wall 7 of the back plate 200. The material of the fixing portion 4 can be aluminum or aluminum alloy, but the present disclosure is not limited thereto. The material of the fixing portion 4 may be the same as that of the supporting portion 3, but they may be different. The fixing portion 4 may be detachably connected with the supporting portion 3, and the fixing portion 4 may not be detachably connected with the supporting portion 3, but the present disclosure is not limited thereto. The fixing portion 4 and the supporting portion 3 can be in an integral structure. When a plurality of display devices of the present disclosure are tiled into a tiled display device, as shown in FIG. 6, one end of the supporting portion 3 close to the display panel is subjected to a pressing force $F_1$ toward the inner side of the supporting portion 3 in the direction parallel to the display panel, since the fixing portion 4 of the present disclosure is fixed to the back plate 200, one end of the supporting portion 3 away from the display panel is supported on the back plate 200, and an angle is formed between the fixing portion 4 and the supporting portion 3, so that the back plate 200 generates the supporting force $F_2$ to the supporting portion 3, and a deformation resistance of the display device is improved.

Further, as shown in FIG. 3, the middle frame 100 of embodiments of the present disclosure may further include a reinforcing portion 11. The reinforcing portion 11 may be connected with one end of the supporting portion 3 close to the bottom wall 8 of the back panel 200 and support the bottom wall 8 of the back panel 200. The reinforcing portion 11 may be connected with one end of the first supporting section 301 away from the second supporting section 302 such that a pressure between the first supporting section 301 and the bottom wall 8 of the back plate 200 may be reduced. In an embodiment, the reinforcing portion 11 may be disposed on a side of the supporting portion 3 away from the side wall 7 of the back plate 200. The reinforcing portion 11 may have a plate-like structure and is parallel to and attached to the bottom wall 8 of the back plate 200.

Figure 8:
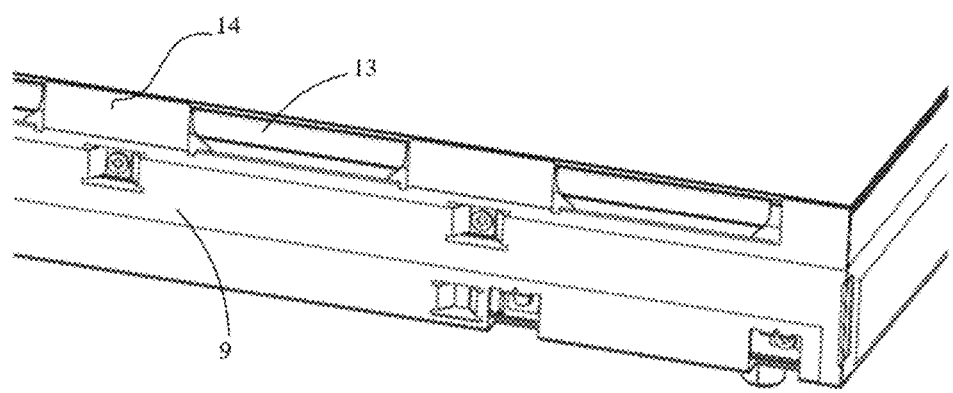
FIG. 8 is a schematic view of a protective board and a chip-on-film according to an embodiment of the present disclosure.
Figure 9:
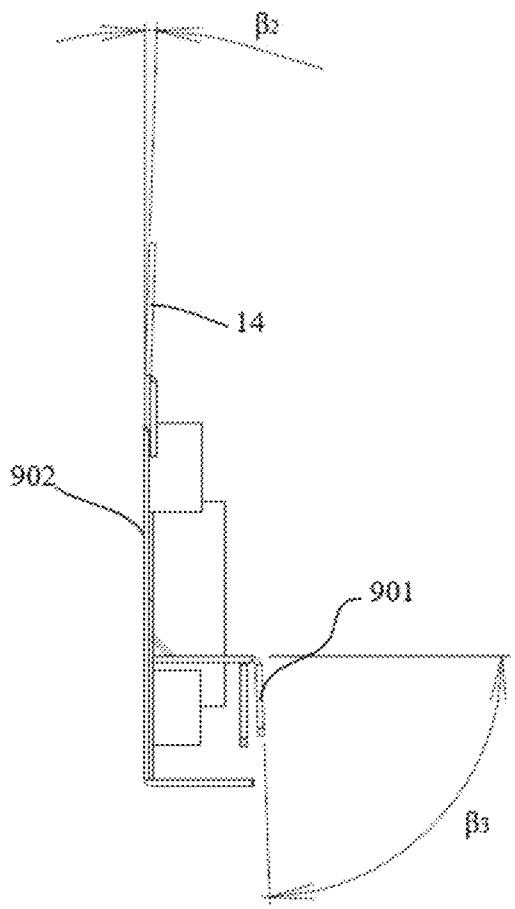
FIG. 9 is a schematic view of a protective plate according to an embodiment of the present disclosure.
Figure 10:
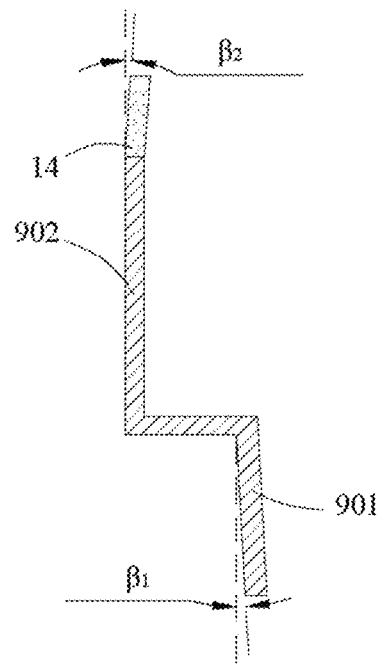
FIG. 10 is a schematic view of an inclination angle of a first plate and a guard member according to an embodiment of the present disclosure.

As shown in FIGS. 5 and 8, the display device of the present disclosure may further include a circuit board 12 and a chip-on-film (COF) 13. The chip-on-film 13 is connected with the binding region 1021 mentioned above, and the chip-on-film covers a partial area of the side surface of the display panel. The chip-on-film 13 may cover a partial area of the side surface of the display panel on a first side. Of course, the chip-on-film 13 may cover a partial area of the side surface of the display panel on the other side. The circuit board 12 may be located on an outside of the frame and electrically connected with the chip-on-film 13. The circuit board 12 may be located on an outside of the side wall 7 of the back plate 200 and opposite to the first wall 701 of the side wall 7 of the back plate 200. Of course, as shown in FIG. 1, the display device of the present disclosure may further include a protective plate 9. The protective board 9 may be connected with the outer side of the first wall 701, and a receiving space is formed between the protective board 9 and the first wall 701 and the circuit board 12 is located in the receiving space. The protective plate 9 may be threadedly attached to the first wall 701, but the present disclosure is not limited thereto. The protective plate 9 may include a first plate 901 and a second plate 902 that are interconnected with each other. The second plate 902 can be located at a side of the first plate 901 close to the display panel, and the first plate 901 is recessed relative to the second plate 902 toward the inner side of the frame, i.e., the second plate 902 is located at the outer side of the first plate 901. The protective plate 9 may further include a third plate 903 connecting the first plate 901 and the second plate 902. The third plate 903 can be parallel to the bottom wall 8, but the present disclosure is not limited thereto. The first plate 901 can be threadedly attached to the first wall 701 with the receiving space mentioned above formed between the second plate 902 and the first wall 701. As shown in FIGS. 9 and 10, the first plate 901 can be inclined toward the inner side of the protective plate 9 with respect to the second plate 902, and the inclination angle $\beta_1$ of the first plate 901 is 1.5°-2.5°, e.g., 1.5°, 1.8°, 2°, 2.5°, etc. In FIG. 9, a sum of $\beta_3$ and $\beta_1$ is equal to 90°.

Figure 7:
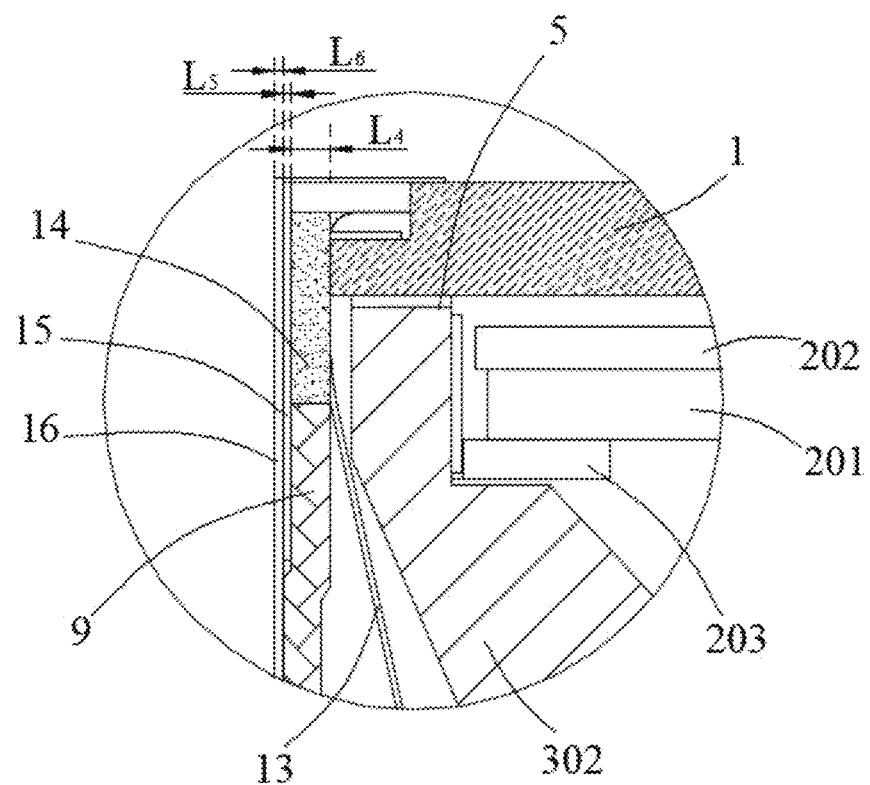
FIG. 7 is an enlarged schematic view of a portion A of the display device shown in FIG. 5.

As shown in FIGS. 7 and 8, the display device of the present disclosure may further include a guard member 14.

The guard member 14 is located on an outer side of the display panel. When a plurality of the display devices of the present disclosure are tiled into a tiled display device, the guard member 14 provided may reduce damage to the sides of the display panel during the tiling process. In an embodiment, the guard member 14 may be located on an outer side of the display panel covered with the chip-on-film 13, and an orthographic projection of the guard member 14 onto the side of the display panel does not overlap with an orthographic projection of the chip-on-film 13 onto the side of the display panel, thereby preventing the guard member 14 from pressing against the chip-on-film 13. The chip-on-films 13 covering one side of the display panel may be plural, and the chip-on-films 13 are spaced along a direction parallel to the side of the display panel. The guard members 14 may also be plural, and the guard members 14 are spaced along the direction parallel to the side of the display panel, and the orthogonal projection of any one of the guard members 14 onto the side of the display panel does not overlap with the orthogonal projection of any one of the chip-on-films 13 onto the side of the display panel. In another embodiment, a side of the chip-on-film 13 opposite to the side of the display panel is provided with an insulating organic film, the orthogonal projection of the guard member 14 onto the side of the display panel overlaps with the orthogonal projection of the chip-on-film 13 onto the side of the display panel, and the guard member 14 is pressed against the insulating organic film, and the stability of the chip-on-film 13 can be improved.

The guard member 14 described above may be connected with the frame of the display panel. For example, as shown in FIGS. 9 and 10, the guard member 14 may be attached to a side of the protective plate 9. Taking the protective plate 9 including the first plate 901 and the second plate 902 as an example, the guard member 14 is attached to a side of the second plate 902 away from the first plate 901. The guard member 14 may integrally extend from the protective board 9, and the guard member 14 is inclined to the display panel with respect to the protective board 9. In this way, when the protective board 9 is fixed to the outer side of the first wall 701 under an external force, the guard member 14 is subjected to a force opposite to the side of the display panel. Since the guard member 14 is inclined to the display panel with respect to the protective plate 9, a gap between the guard member 14 and the side of the display panel is prevented from being increased and the display effect is prevented from being affected. An inclination angle $\beta_2$ of the guard member 14 may be 1°-2°, e.g., 1°, 1.5°, 2°, etc.

Figure 11:
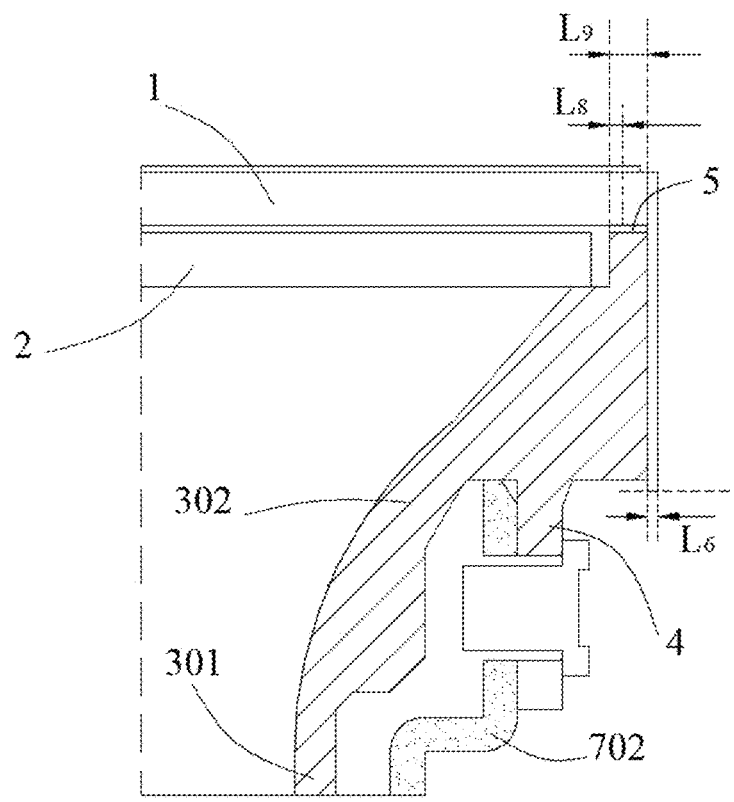
FIG. 11 is yet another schematic cross-sectional view of a display device according to an embodiment of the present disclosure.

In addition, the structure shown in FIG. 11 and the structure shown in FIG. 7 are respectively located on two opposite sides of the display panel. In FIG. 7, a width of the first supporting surface 5 is equal to 0.8 mm, that is, a width of an adhesive area between the first supporting surface 5 and the display panel is equal to 0.8 mm, a thickness $L_4$ of the protective plate 9 is equal to 0.4 mm, a thickness $L_5$ of the first protective adhesive 15 is equal to 0.1 mm, a thickness $L_6$ of the second protective adhesive 16 is equal to 0.05 mm. The first supporting surface 5 in FIG. 7 is not overlapped with the display region 101 of the display panel, and the non-display region shown in FIG. 7 may be the first non-display region 102 mentioned above. The first protective adhesive 15 and/or the second protective adhesive 16 may be a cosmetic tape. In FIG. 11, a width L9 of the first supporting surface 5 is equal to 1 mm, that is, a width of an adhesive area between the first supporting surface 5 and the display panel is equal to 1 mm. The non-display region shown in FIG. 11 can be the second non-display region 103 mentioned above. The first supporting surface 5 and the second non-display region 103 in FIG. 11 partially overlap, and a width $L_8$ of an overlapping area is equal to 0.2 mm, and a thickness $L_6$ of the second protective adhesive 16 is equal to 0.05 mm.

Figure 12:
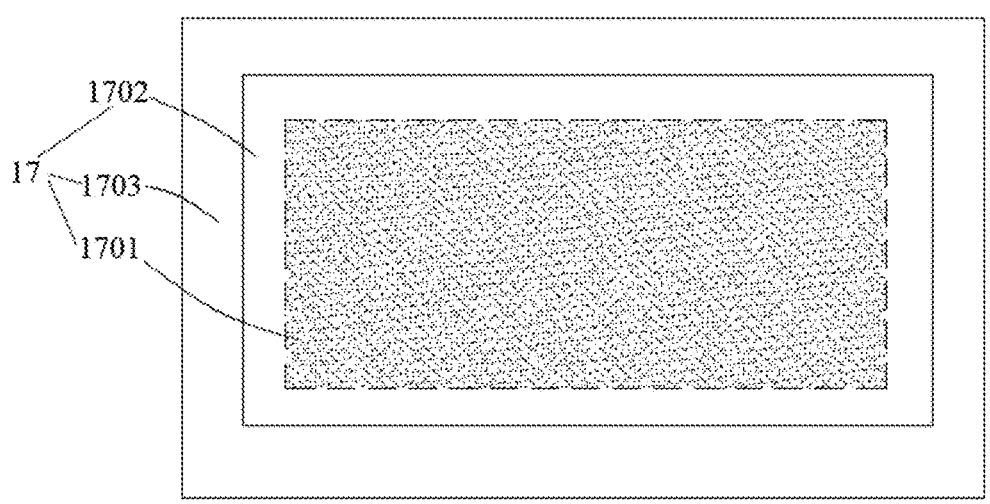
FIG. 12 is a schematic view of a first light-emitting region, a second light-emitting region, and a third light-emitting region of a display device according to an embodiment of the present disclosure.
Figure 13:
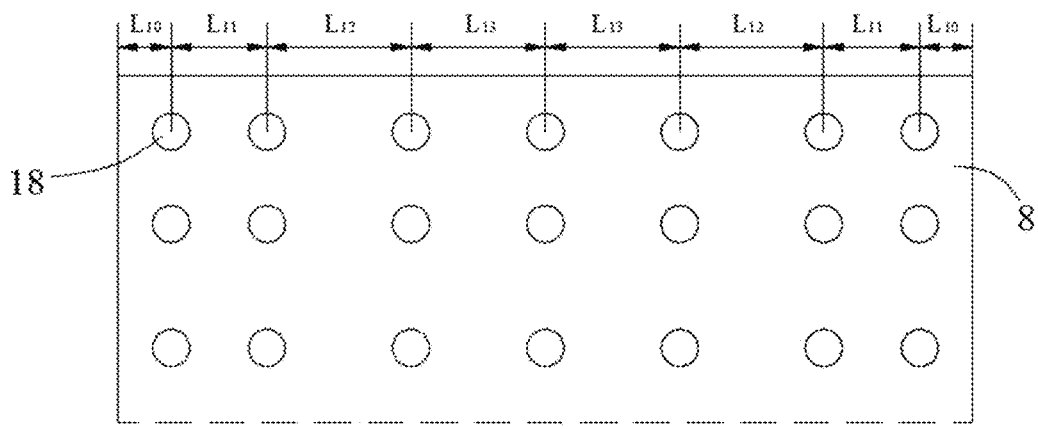
FIG. 13 is a schematic view of a light-emitting structure of a display device according to an embodiment of the present disclosure.

As shown in FIG. 12, the display device of the present disclosure may further include a light-emitting structure 17. The light-emitting structure 17 may be disposed on a surface of the bottom wall 8 facing the display panel, and includes a first light-emitting region 1701, a second light-emitting region 1702, and a third light-emitting region 1703 along a direction parallel to the bottom wall 8. The second light-emitting region 1702 surrounds the first light-emitting region 1701, the third light-emitting region 1703 surrounds the second light-emitting region 1702, and the third light-emitting region 1703 is located at an edge region of the light-emitting structure 17. The light-emitting intensity per unit area of the third light-emitting region 1703 is greater than that of the first light-emitting region 1701, and the light-emitting intensity per unit area of the first light-emitting region 1701 is greater than that of the second light-emitting region 1702. As shown in FIG. 13, the bottom wall 8 of the back plate 200 is provided with a plurality of light sources 18 which constitute a plurality of light source columns, and the light source columns are symmetrically distributed. A distance between adjacent light source columns in the first light-emitting region 1701 is less than a distance between adjacent light source columns in the second light-emitting region 1702, and a distance between adjacent light source columns in the third light-emitting region 1703 is less than the distance between adjacent light source columns in the first light-emitting region 1701.

For example, as shown in FIG. 13, $L_{10}$ is a distance from a first light source column to the inner surface of the second supporting section 302, $L_{11}$ is a distance from a second light source column to the first light source column, $L_{12}$ is the distance from a third light source column to the second light source column, and $L_{13}$ is the distance from a fourth light source column to the third light source column. The distance between a plurality of adjacent light source columns may be equal to $L_{13}$ in the display device of the present disclosure. $L_{10}$ may be equal to 18.3 mm, $L_{11}$ may be equal to 54.5 mm, $L_{12}$ may be equal to 90 mm, and $L_{13}$ may be equal to 74.674 mm. A plurality of light source columns with a distance equal to $L_{13}$ may constitute the first light-emitting region 1701, a plurality of light source columns with a distance equal to $L_{12}$ may constitute the second light-emitting region 1702, and a plurality of light source columns with a distance equal to $L_{11}$ may constitute the first light-emitting region 1701. As shown in FIG. 14, the inner surface of the second supporting section 302 is capable of reflecting light to a region of the display panel corresponding to the second light-emitting region 1702, such that the light-emitting intensity per unit area of the second light-emitting region 1702 is smaller than the light-emitting intensity per unit area of the first light-emitting region 1701 in the present disclosure. That is, in the present disclosure, the light-emitting intensity per unit area of the second light-emitting region 1702 has a small value, so that a brightness of the display panel corresponding to the second light-emitting region 1702 can be avoided to be too high, and the display uniformity can be improved. In addition, each of the light sources 18 may have a light emitting angle of 160°. In addition, the display device of the present disclosure may further include a reflector between the bottom wall 8 and the light-emitting structure 17. The reinforcing portion 11 (see FIG. 5) is supported on an edge region of the reflector and can solve a problem of a non-uniform brightness due to the edge warpage of the reflector.

An inner edge of the UV adhesive coated on the first supporting surface 5 is spaced apart from the display region 101 of the display panel by a horizontal distance of 0.1 mm-0.8 mm, so as to prevent the UV adhesive from blocking the display region 101 and reduce the display brightness and uniformity of the edges of the display region; at the same time, the UV adhesive coated on the first supporting surface 5 is spaced apart from the outer edge of the display panel by a horizontal distance of 0.1 mm-0.8 mm, so as to prevent the UV adhesive from spilling to adhere to the chip-on-film. The light guiding bar 203 is attached to the side wall of the second supporting surface 6, and a distance between the light guiding bar 203 and the side wall of the second supporting surface 6 is smaller than a distance between the edge of the diffuser plate 201 and the side wall of the second supporting surface 6. The side wall of the second supporting surface 6 is the supporting side mentioned above.

Embodiments of the present disclosure further provide a tiled display device. The tiled display device may be obtained by tiling the display devices of the embodiments described above. Since the display device included in the tiled display device according to the embodiment of the present disclosure is the same as the display device in the embodiments of the display device described above, it has the same advantages, and the detailed description thereof is omitted here for brevity in the present disclosure.

The above description is only preferred embodiments of the present disclosure and does not limit the present disclosure in any form. Although the present disclosure has been disclosed in the preferred embodiments, it is not intended to limit the present disclosure. Those skilled in the art can change or modify the disclosed technical contents to equivalent embodiments, without departing from a scope of the technical solution of the present disclosure. However, any simple modification, equivalent changes and modifications of the above embodiments according to the technical essence of the present disclosure, without departing from the content of the technical solution of the present disclosure, are still within the scope of the technical solution of the present disclosure.

The invention claimed is:

1. A display device, comprising:
   a display panel;
   a backlight module located on an incident side of the display panel and comprising a frame and a light guiding structure,
   wherein the frame comprises a first supporting surface and a second supporting surface both facing the display panel,
   wherein the second supporting surface is located on a side of the first supporting surface away from the display panel, the first supporting surface is attached to a backlight surface of the display panel, and the second supporting surface is engaged with the light guiding structure;
   wherein the frame further comprises:
   a back plate; and
   a middle frame comprising a fixing portion and a supporting portion, wherein the first supporting surface and the second supporting surface are at one end of the supporting portion;
   wherein the other end of the supporting portion extends away from the display panel and contacts the back plate;
   wherein the fixing portion is located on an outside of the supporting portion, one end of the fixing portion is fixed to the back plate, the other end of the fixing portion is between the one end of the supporting portion and the other end of the supporting portion, and an angle is formed between the fixing portion and the supporting portion.

2. The display device according to claim 1, wherein the back plate comprises:
   a bottom wall by which one end of the supporting portion is supported; and
   a side wall connected with the bottom wall and located between the fixing portion and the supporting portion.

3. The display device according to claim 2, wherein the fixing portion is fixed to an end of the side wall away from the bottom wall,
   wherein the middle frame further comprises:
   a reinforcing portion connected with an end of the supporting portion close to the bottom wall and supported by the bottom wall, wherein the reinforcing portion is disposed at a side of the supporting portion away from the side wall.

4. The display device according to claim 3, wherein the side wall comprises a first wall and a second wall connected with each other, the second wall is located on a side of the first wall away from the bottom wall, the second wall is located on an outer side of the first wall; wherein the fixing portion is fixed to the second wall; and wherein the display device further comprises:
   a chip-on-film covering a part of a side of the display panel;
   a protective plate connected with an outer side of the first wall, wherein a receiving space is formed between the protective plate and the first wall; and
   a circuit board located in the receiving space and electrically connected with the chip-on-film.

5. The display device according to claim 3, further comprising:
   a light-emitting structure on a side of the bottom wall facing the display panel; and
   a reflector between the bottom wall and the light-emitting structure,
   wherein the reinforcing portion is pressed against an edge region of the reflector.

6. The display device according to claim 1, wherein the one end of the supporting portion close to the display panel is bent toward an outer side of the supporting portion.

7. The display device according to claim 6, wherein the supporting portion comprises a first supporting section and a second supporting section connected with each other, the second supporting section is located at a side of the first supporting section close to the display panel, the first supporting section is perpendicular to the display panel, and the second supporting section is inclined toward an outer side of the supporting portion with respect to the first supporting section, and
   the fixing portion is connected with the second supporting section.

8. The display device according to claim 6, wherein the back plate comprises:
   a bottom wall by which one end of the supporting portion is supported;
   a side wall connected with the bottom wall, the side wall being located between the fixing portion and the supporting portion;
   the display device further comprises:

a light-emitting structure disposed on a surface of the bottom wall facing the display panel, wherein the light-emitting structure comprises a first light-emitting region, a second light-emitting region, and a third light-emitting region, the first light-emitting region is surrounded by the second light-emitting region, the second light-emitting region is surrounded by the third light-emitting region, the third light-emitting region is located at an edge region of the light-emitting structure, and a light-emitting intensity per unit area of the third light-emitting region is greater than a light-emitting intensity per unit area of the first light-emitting region.

9. The display device according to claim 1, wherein the first supporting surface is parallel to a side of the display panel, and a width of the first supporting surface is 0.3 mm-2 mm.

10. The display device according to claim 9, wherein a width of the first supporting surface is 0.88 mm or 1.76 mm.

11. The display device according to claim 1, further comprising:
a chip-on-film connected with the display panel and covering a part of a side of the display panel; and
a guard member located on an outer side of the display panel and connected with the frame, wherein an orthographic projection of the guard member onto the side of the display panel does not overlap with an orthographic projection of the chip-on-film onto the side of the display panel,
a number of chip-on-films are plural, and the chip-on-films are spaced apart along a direction parallel to the side of the display panel; and
a number of guard members are plural, and the guard members are spaced apart along the direction parallel to the side of the display panel, and an orthogonal projection of any one of the guard members onto the side of the display panel does not overlap with an orthogonal projection of any one of the chip-on-films onto the side of the display panel.

12. The display device according to claim 11, further comprising:
a circuit board located on an outside of the frame and electrically connected with the chip-on-film; and
a protective plate connected with an outer side of the frame, wherein a space for receiving the circuit board is formed between the protective plate and the frame; and the guard member is connected with a side of the protective plate.

13. The display device according to claim 12, wherein the protective plate comprises a first plate and a second plate connected with each other, the second plate is located at a side of the first plate close to the display panel in a direction perpendicular to the display panel, the second plate is located at an outer side of the first plate, the first plate is connected with an outer side of the frame, a space for receiving the circuit board is formed between the second plate and the frame, and the guard member is connected with a side of the second plate away from the first plate.

14. The display device according to claim 13, wherein the frame comprises:
a back plate comprising a side wall, the side wall being perpendicular to the display panel,
wherein the protective plate is located on an outer side of the side wall of the back plate, the first plate is fixed to the side wall of the back plate, the first plate is inclined toward an inner side of the protective plate with respect to the second plate, and an inclination angle of the first plate is 1.5°-2.5°.

15. The display device according to claim 1, wherein, in a direction parallel to the display panel, the display panel comprises a first side and a second side opposite to each other; wherein the display panel comprises a display region and a non-display region surrounding the display region; wherein the non-display region comprises a first non-display region on a first side of the display panel and a second non-display region on a second side of the display panel; and a sum of a width of the first non-display region and a width of the second non-display region is equal to 2 mm,
wherein the first non-display region comprises a binding region, the first non-display region and the second non-display region are provided with a frame adhesive, a width of the first non-display region is equal to 1.2 mm, and a width of the second non-display region is equal to 0.8 mm.

16. The display device according to claim 1, wherein the light guiding structure comprises a diffuser plate, and a material of the diffuser plate is polystyrene,
a polarizer is provided on each of the incident side and an exit side of the display panel, the first supporting surface is coated with a fixing adhesive, and the first supporting surface is bonded to the polarizer on the incident side of the display panel by the fixing adhesive, and
the display panel comprises a display region and a non-display region, and an inner edge of the fixing adhesive is spaced apart from the display region of the display panel by a distance of 0.1 mm-0.8 mm; and the fixing adhesive is spaced apart from an outer edge of the display panel by a distance of 0.1 mm-0.8 mm.

17. The display device according to claim 1, wherein the light guiding structure comprises:
a diffuser plate disposed opposite to the display panel; and
a light guiding bar bonded between the diffuser plate and the second supporting surface and fixing edges of the diffuser plate on the second supporting surface, a transmittance of the light guiding bar is 60%-99%,
the light guiding bar is attached to a side wall of the second supporting surface, and a distance between the light guiding bar and the side wall of the second supporting surface is smaller than a distance between the edges of the diffuser plate and the side wall of the second supporting surface, and
the light guiding structure and the second supporting surface are bonded by an adhesive, and a light transmittance of the adhesive is 60%-99%.

18. The display device according to claim 1, further comprising:
a chip-on-film connected with the display panel and covering a part of a side of the display panel, wherein a side of the chip-on-film opposite to the side of the display panel is provided with an insulating film; and
a guard member disposed on an outer side of the display panel and connected with the frame, wherein the guard member is pressed against the insulating film.

19. A tiled display device, comprising a tiled plurality of the display devices of claim 1.

20. A display device, comprising:
a display panel;
a backlight module located on an incident side of the display panel and comprising a frame and a light guiding structure, wherein the frame comprises a first supporting surface and a second supporting surface both facing the display panel, wherein the second supporting surface is located on a side of the first supporting surface away from the display panel, the first supporting surface is attached to a backlight surface of the display panel, and the second supporting surface is engaged with the light guiding structure;

a chip-on-film connected with the display panel and covering a part of a side of the display panel, wherein a side of the chip-on-film opposite to the side of the display panel is provided with an insulating film; and a guard member disposed on an outer side of the display panel and connected with the frame, wherein the guard member is pressed against the insulating film.

* * * * *

UNITED STATES PATENT AND TRADEMARK OFFICE
CERTIFICATE OF CORRECTION

Page 1 of 1

PATENT NO. : 12,222,538 B2
APPLICATION NO. : 18/282218
DATED : February 11, 2025
INVENTOR(S) : Zhaoshou Tian et al.

It is certified that error appears in the above-identified patent and that said Letters Patent is hereby corrected as shown below:

On the Title Page

Item (73) should read:
(73) Assignees: Beijing BOE Display Technology Co., Ltd., Beijing (CN); BOE Technology Group Co., Ltd., Beijing (CN)

Signed and Sealed this
Twelfth Day of August, 2025

Coke Morgan Stewart
*Acting Director of the United States Patent and Trademark Office*